US006489920B1

(12) United States Patent
Anders et al.

(10) Patent No.: US 6,489,920 B1
(45) Date of Patent: Dec. 3, 2002

(54) METHOD FOR DETECTING A VEHICLE TRAFFIC STATUS AND SYSTEM FOR DETECTING SAID TRAFFIC STATUS

(75) Inventors: Armin Anders, Müchen (DE); Matthias Stein, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/744,008

(22) PCT Filed: Jul. 16, 1999

(86) PCT No.: PCT/DE99/02214

§ 371 (c)(1), (2), (4) Date: Jan. 17, 2001

(87) PCT Pub. No.: WO00/04524

PCT Pub. Date: Jan. 27, 2000

(30) Foreign Application Priority Data

Jul. 17, 1998 (DE) ........................................ 198 32 311

(51) Int. Cl.[7] ........................ G01S 13/88; G01S 13/89; G01S 13/90

(52) U.S. Cl. .......................... 342/179; 342/25; 342/52; 342/58; 342/175; 342/176; 342/190; 342/195; 340/934; 701/117; 701/118

(58) Field of Search ............................ 342/25, 27, 28, 342/52–66, 175, 176, 179, 188, 189–197, 104; 340/934, 933; 705/7, 8; 701/117, 118, 119

(56) References Cited

U.S. PATENT DOCUMENTS 3,239,653 A * 3/1966 Barker ....................... 701/118
3,626,413 A * 12/1971 Zachmann ................. 342/104
5,235,506 A * 8/1993 O'Brien, Jr. ................... 705/8
5,402,346 A * 3/1995 Lion et al. .................. 701/117
5,559,516 A 9/1996 Didomizio et al.
5,663,720 A 9/1997 Weissman
5,818,383 A 10/1998 Stockburger et al.

FOREIGN PATENT DOCUMENTS

EP 0 716 317 A1 6/1996
EP 0 911 779 A2 4/1999

OTHER PUBLICATIONS

Simple MTI Using Synthetic Aperture Radar—A. Freeman—XP 000672054 Proceedings of IG '84 Symposium; Aug. 1984; Strasboug, France.

Congestion Data Acquisition Using High Resolution Satellite Imagery and Frequency Analysis Techniques—Kim et al—XP–002130129 1997 IEEE, Jul. 1997.

* cited by examiner

*Primary Examiner*—Bernarr E. Gregory
(74) *Attorney, Agent, or Firm*—Young & Thompson

(57) ABSTRACT

From a body located at a distance above the surface of the earth, an image is recorded of a region that is located underneath the body on or above the surface of the earth and that has a diameter of at least one kilometer. The recorded image is fully geocoded and comprises a grid dimension small enough that vehicle densities located in the region can be recognized. The recorded image is evaluated with respect to these vehicle densities and the spatial allocation thereof to the associated roadways. The method is used for acquisition of the state of street traffic over a large area.

20 Claims, 4 Drawing Sheets

METHOD FOR DETECTING A VEHICLE TRAFFIC STATUS AND SYSTEM FOR DETECTING SAID TRAFFIC STATUS

BACKGROUND OF THE INVENTION

The invention relates to a method for acquiring a traffic state of vehicles and to an apparatus for acquiring such a traffic state.

For the goal-oriented use of traffic guidance systems, a reasonable adjustment of the switching phases of light signal apparatuses, and for a determination of roadway construction measures that is in accordance with traffic conditions, a computer-supported simulation and forecasting of traffic flow that is as comprehensive as possible is necessary. In order to match the programs used for this purpose with actual conditions, comprehensive information about the actual state of traffic in the areas under consideration must however be present. In densely populated areas in particular, it is hereby not sufficient to acquire only individual roadways with regard to traffic flows; rather, an image of the traffic situation that is as complete as possible, including possible alternative routes, detours, etc., is required.

The acquisition of the actual traffic state that is important for the optimization of the traffic flow has up to now been carried out via measurement installations at the infrastructure, for example in street traffic via measurement loops in the roadway or by means of traffic counts that are highly personnel-intensive. However, these techniques are very strongly locally limited, and do not allow an overall view. In addition, their diagnostic effectiveness may be low, according to whether the measurement location has been chosen correctly or incorrectly. In addition, measurement apparatuses at the infrastructure are stationary and are connected with significant costs both for installation and for maintenance. For these reasons, as a rule these measurement methods are limited to few locations.

SUMMARY OF THE INVENTION

It is an object of the invention to provide a method for acquisition of a traffic state of vehicles over a large area.

According to the method of the present invention for acquiring a traffic state of vehicles, from a body located at a distance above a surface of the earth, recording an image of the region located underneath the body at or above the surface of the earth and that has a lateral diameter of at least one kilometer. The image is recorded with a grid dimension that is small enough that densities of at least one particular type of vehicle located in the region can be recognized up to a predetermined maximum density. The recorded image is evaluated with regard to at least one density for at least one type of vehicle.

According to this solution, from a body located at a distance above the surface of the earth an image is recorded of a region that is located underneath the body on and/or above the surface of the earth and that has a lateral diameter of at least one kilometer, said image being recorded with a grid dimension that is small enough so that densities of at least one of a particular type of vehicle located in the region can be recognized, up to a predetermined maximum density, and the recorded image is evaluated with regard to at least one density at least of the one type of vehicle.

As a body, a geosatellite orbiting the earth is preferably used. Due to its great distance from the surface of the earth—on the order of 100 kilometers—such a satellite has the advantage that particularly large regions, of for example 50×100 kilometers surface area, and in any case a region having a diameter on the order of magnitude of 10 kilometers, can be monitored.

In this way, traffic of every type and/or type of vehicle, including land vehicles not bound by rail, for example all types of passenger vehicle and/or truck, rail-bound vehicles, for example all types of railway trains for passenger or freight traffic, water vehicles, for example all types of passenger and freight ships, both at sea and on inland waterways, as well as aircraft, for example all types of passenger and freight airplane, can advantageously be monitored rapidly and reliably over a larger area than was previously known or possible. In particular, vehicles can advantageously be monitored, in particular simultaneously, both in a manner separated according to the species and/or type of vehicle and also in a manner disregarding the species and/or type of vehicle.

With a single satellite orbiting the earth, every 2 to 4 days individual images and chronological sequences of images of the same region can be produced.

As a body, a geostationary geosatellite can also be used, which advantageously enables a constant monitoring of traffic in a region of almost the size of an entire hemisphere, for example the ship traffic in the Atlantic or Pacific.

From a geosatellite, images of the large regions can be produced optically with sufficiently high resolution, but this type of recording depends on the time of day and on the weather. If in contrast radar radiation is used for recording the images, the images can advantageously be recorded at all times of day and in all types of weather. However, a radar radiation and a radar system must be used that enable images having a sufficiently small grid dimension, corresponding to a sufficiently high resolution. A dimension of two meters is regarded as the lower limit of the grid dimension, at least in relation to street traffic, in order to enable differentiation of lane positions. Densities of street vehicles can thereby be unambiguously recognized and allocated, because the vehicles have different degrees of reflection than do the roadways, and corresponding differences of brightness therefore exist in the recorded images.

Instead of a body in the form of a satellite, a body in the form of an aircraft can also be used in the inventive method, whereby as an aircraft an airplane can primarily be used, but for example a balloon or the like is also possible. From the airplane, images of regions of a width of five to seven kilometers can for example be realized, and in any case regions comprising a diameter of the order of magnitude of 1 kilometer.

In order to remain independent of the time of day and the weather conditions in this case as well, it is again recommended that the images be recorded not optically but rather using radar, advantageously SAR. Here as well, in relation to street traffic two meters is regarded as the lower limit of the grid dimension.

In any case, it is thus advantageous to record an image by means of a radiation of radar.

If the images are recorded with the aid of interferometry and/or the Doppler effect, it is advantageously possible to acquire velocities of the vehicles in addition to vehicle densities.

The inventive method is particularly advantageous for the acquisition over a large area of a state of street traffic and for monitoring and guiding the street traffic in large cities, but is also suitable for use in smaller cities and/or rural areas, but is not limited to this, but rather can, as already mentioned, in principle also be used for monitoring the movement of railway trains, ships and/or aircraft, particularly in harbor areas and airport areas.

An advantage of the inventive method can be seen in its suitability for the use of georeferencing, which enables a rapid and precise allocation between a point in the region and the corresponding point on the recorded image of this region. In an advantageous realization of the inventive method, a spatial allocation is created between a vehicle density recognized in an image of the region and a roadway of the region, using georeferencing, which, in particular given images recorded from artificial geosatellites, enables a spatial allocation of vehicle densities to the respective roadways.

A monitoring of modifications of the traffic conditions can advantageously be achieved if after recording an image of the region at least one additional image of the same region is recorded and is likewise evaluated with regard to vehicle densities found in the region, and if at least two recorded images are compared with one another. In this way, a direct optimization, for example in relation to street traffic, of the control algorithms of traffic guidance systems and traffic light phases can advantageously be realized by means of a comparison before and after the optimization technique. In addition, intended modifications by means of street construction techniques can advantageously be monitored, and existing simulation programs can be precisely matched.

In this case, it is particularly advantageous if at least a sequence of two images of the region is produced by individual momentary exposures that succeed one another chronologically within one hour. Such a sequence of images can advantageously be used for the acquisition of the traffic state and the chronological modification thereof in real time, or can also be used at a later time, for example in reference to the street traffic for the production of current traffic conditions for traffic information, the direct controlling of traffic guidance systems, and for the adjustment of traffic flow simulations, whereby in addition a direct optimization of the control algorithms of traffic guidance systems and traffic light phases can be realized by a before/after comparison. The evaluation of the exposures can take place manually, or else, in a shorter time and with a lower personnel expense, by machine, if a system is available for the recognition of vehicle density in the images and for the spatial allocation of the vehicle densities to the respective roadways.

The actual evaluation of the exposures can take place already in the body, for example on board the satellite or aircraft. An advantageous arrangement, suitable for this purpose, for acquiring a traffic state is when the body, located at a distance above the surface of the earth, in particular a geosatellite orbiting the earth, is a geostationary geosatellite or is an aircraft.

According to an advantageous construction of the inventive arrangement, the evaluation unit converts a particular information content of a recorded image into coded data signals.

The evaluation unit advantageously produces georeferenced coded data signals, with the aid of which a reference to land maps for roadways to be examined, and thereby a spatial allocation of vehicle densities to respective roadways, is produced.

From the coded data signals, an item of information concerning a traffic state in the relevant region is obtained, preferably using a processing unit for a processing of the data signals in order to obtain an item of information concerning a traffic state in the region. The processing unit is preferably located on the surface of the earth, in particular in stationary fashion.

An item of information concerning a traffic state in the region is supplied for a further use, preferably in the form of data that are relevant only for this use, and preferably in a use unit provided for this use. For various uses concerning a traffic state, different use units can be used, which are preferably located on the surface of the earth, in particular in stationary fashion.

In the following specification, the invention is explained in more detail in exemplary fashion on the basis of the figures.

Figure 1:
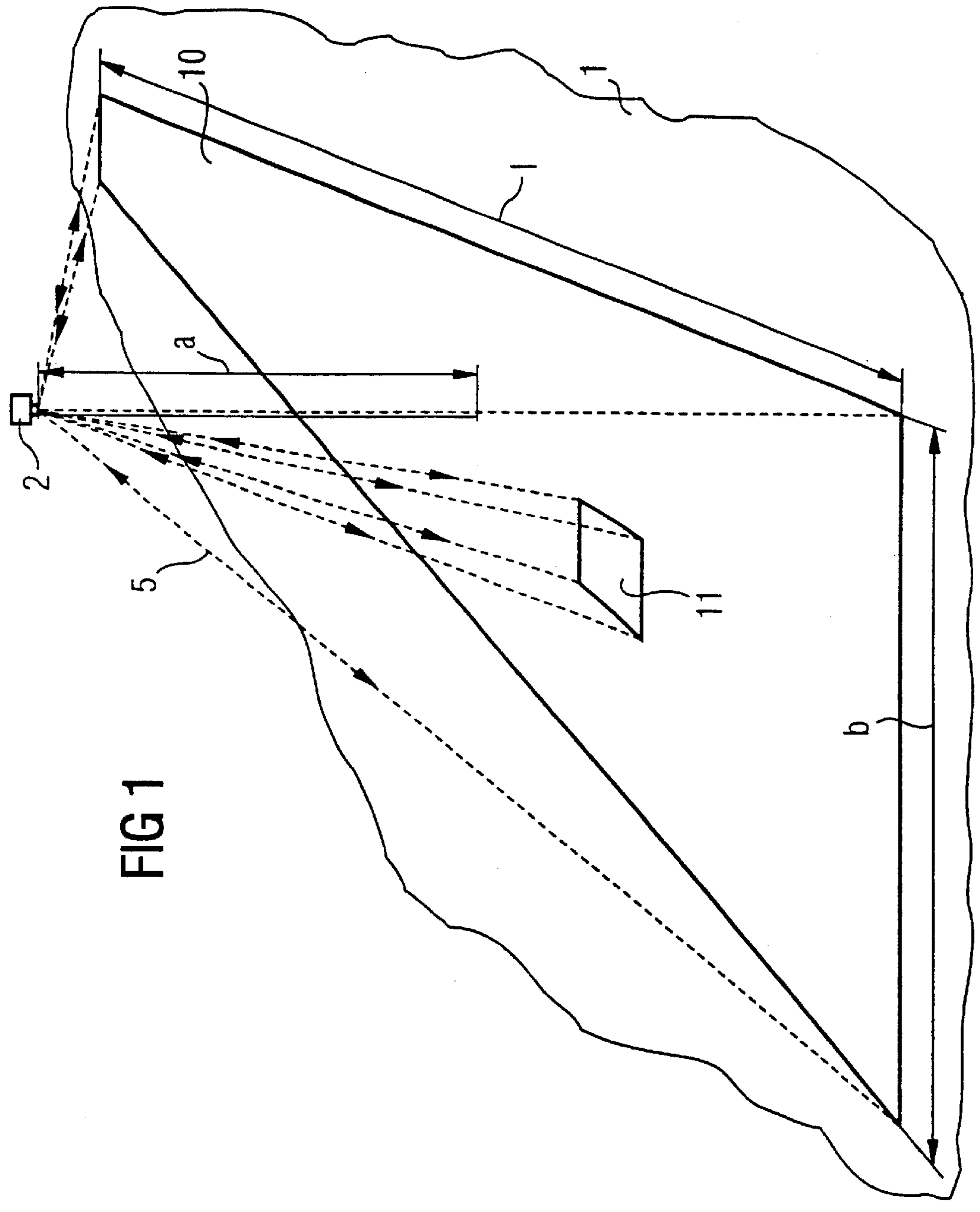
FIG. 1 shows, in a perspective view, a body located at a distance from the surface of the earth, from which at least one image of a region of the surface of the earth is recorded.

The figures are schematic and are not to scale.

DESCRIPTION OF THE PREFERRED EMBODIMENTS

According to FIG. 1, a body 2 from which an image of a region 10 is recorded is located at a distance a above the surface of the earth 1, said region being located below the body 2 or in the airspace over the surface of the earth 1. The body 2 can be a geosatellite or an aircraft. The surface of the earth 1 should be understood as not only the surface of solid land, but also the water surface of the earth.

Let it be assumed that the body 2 is an artificial satellite that orbits the earth at a distance a standard for such satellites, on the order of magnitude of 100 kilometers.

From this satellite 2, an image of a region 10—for example, strip-shaped—having a length l of approximately 100 kilometers and a width b of approximately 50 kilometers is recorded. In FIG. 1, the curvature of the surface of the earth 1 is ignored.

The image is to be recorded using a radiation 5 that ensures that in the image a grid dimension is small enough that densities at least of a particular type of vehicle located in the region 10 can be recognized, up to a predetermined maximum density.

Figure 2:
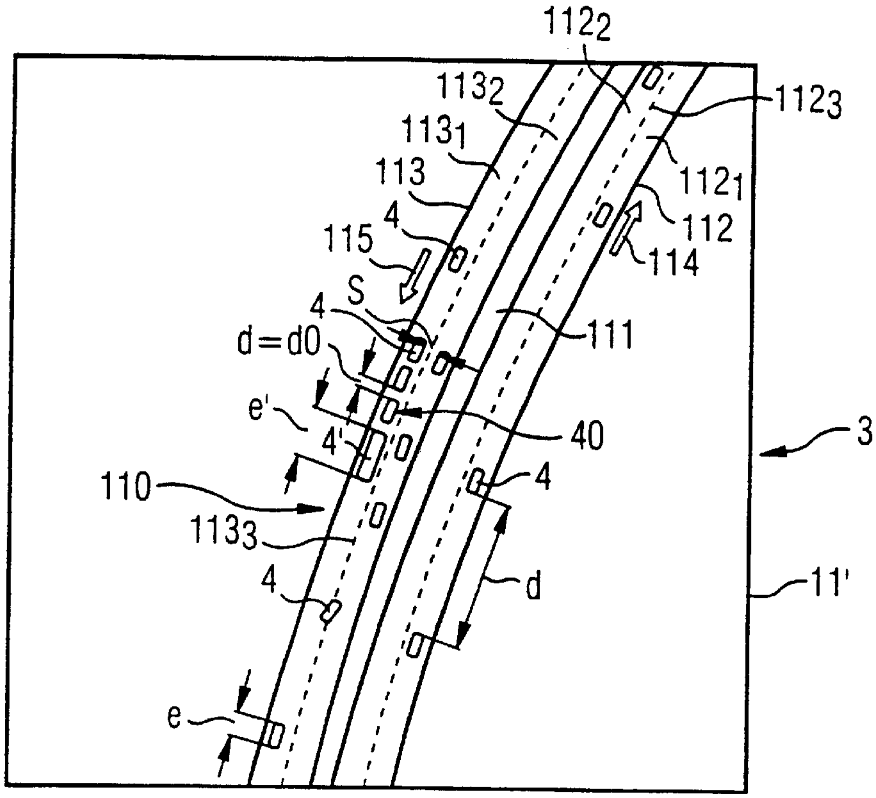
FIG. 2 shows a detail of an image of a region of the surface of the earth recorded photographically from an artificial satellite orbiting the earth.

In FIG. 2, a detail 11' of an image 3, recorded from the satellite 2, of the region 10 is shown, it being assumed that this image 3 of the region 10 is produced photographically, that is, using an optical radiation 5, and the image detail 11' corresponds to the relatively small section 11 of the region 10 in FIG. 1. The optical radiation 5 can be ultraviolet, visible, and/or infrared light.

In this photographically recorded image 3 of the region 10, and therefore also in the image detail 11', there is a grid dimension that is determined by the wavelengths of the optical radiation 5 that is used and the resolution capacity of an optical recording apparatus. In this case, grid dimensions well under 0.5 meters are possible, so that objects such as individual vehicles are imaged with fairly sharp contours.

For example, let the region 10 be a part of the surface of the earth 1 covered with a network of streets and highways, and let a highway 110, traveled by vehicles, run through the segment 11 of the region 10. Other recognizable structures of the landscape in the section 11 of the region 10, such as for example trees and bushes, houses, additional streets, rivers, bridges, etc., are omitted in the image detail 11' according to FIG. 2 for the sake of simplicity.

The highway 110 comprises for example of two roadways 112 and 113, separated from one another by a green strip 111, of which each for example comprises two lanes $\mathbf{112}_1$, $\mathbf{112}_2$, or, respectively, $\mathbf{113}_1$, $\mathbf{113}_2$, each two being for example separated by a dividing line $\mathbf{112}_3$ or, respectively, $\mathbf{113}_3$.

Let the roadway 112 be provided for the direction of travel 114 from bottom to top, and let the roadway 113 be provided for the direction of travel 115 from top to bottom.

Vehicles located on the roadways 112 and 113 standardly include passenger vehicles, buses, and trucks with and without trailers. For example, in FIG. 2 a single truck or bus is present that is located in lane 113, and is designated 4', while all other vehicles on the highway 110 are assumed to be passenger vehicles, of which each is already visually distinguished merely by its shorter length e in comparison to the length e' of the truck or bus. Some individual passenger vehicles are designated 4, as representative of the others. A total of thirteen passenger vehicles are located on the segment of the highway 110 in the image detail 11'.

Assuming right-hand traffic, for example, three passenger vehicles 4 are lined up closely to one another behind the truck or bus 4', for example on the right lane $\mathbf{113}_1$ of the roadway 113, since for example the truck or bus 4' is at this moment being overtaken by a faster-traveling passenger vehicle 4 on the left lane $\mathbf{113}_2$, and the three passenger vehicles 4 must wait behind the truck or bus 4' until the left lane $\mathbf{113}_2$ is free again.

The density of vehicles on a lane is determined by the distance d between vehicles succeeding one another in the direction of travel (or also opposite the direction of travel). The greater the distance d between successive vehicles, the lower the density of the vehicles.

In the example according to FIG. 2, in the group of vehicles 40 comprising the truck or bus 4' and the three passenger vehicles 4 lined up close to one another therebehind, a maximum density of the vehicles is present, since in this group 40 the distance d0 between the successive vehicles 4' and 4 is visibly minimal in comparison to the distances d existing between the successive vehicles 4 not belonging to the group 40.

The absolute maximum density of vehicles on a lane is given when the vehicles bump into one another with no gap, that is, when d is equal to zero. In street traffic, the absolute maximum density, apart from singular cases, does not occur, because the vehicle drivers strive always to maintain a minimum distance d greater than 0.

The grid dimension r determines in general a maximum density of the vehicles, above which densities of the vehicles, determined by distances $0 \leqq d \leqq r$, cannot be distinguished from one another and therefore cannot be recognized, because the vehicles can no longer be kept separate from one another. In contrast, vehicles with distances $d>r$ can be kept separate from one another, and densities of these vehicles, determined by distances d, which area whole-number multiple of the grid dimension r, can be distinguished from one another and thereby recognized.

If the maximum density $d=r$ of the vehicles is present, with the aid of the grid dimension r a lower limit is indicated for the number of vehicles contained in the continuously appearing queue of vehicles that cannot be distinguished.

In relation to FIG. 2, it is for example assumed that the photographic optical recording apparatus used has a resolution capacity high enough that the grid dimension r is approximately 0.1 meters, and a predetermined maximum density of the vehicles is thus essentially equivalent to the absolute maximum density, because in relation to the size of vehicles, 0.1 meters is negligibly small.

Figure 3:
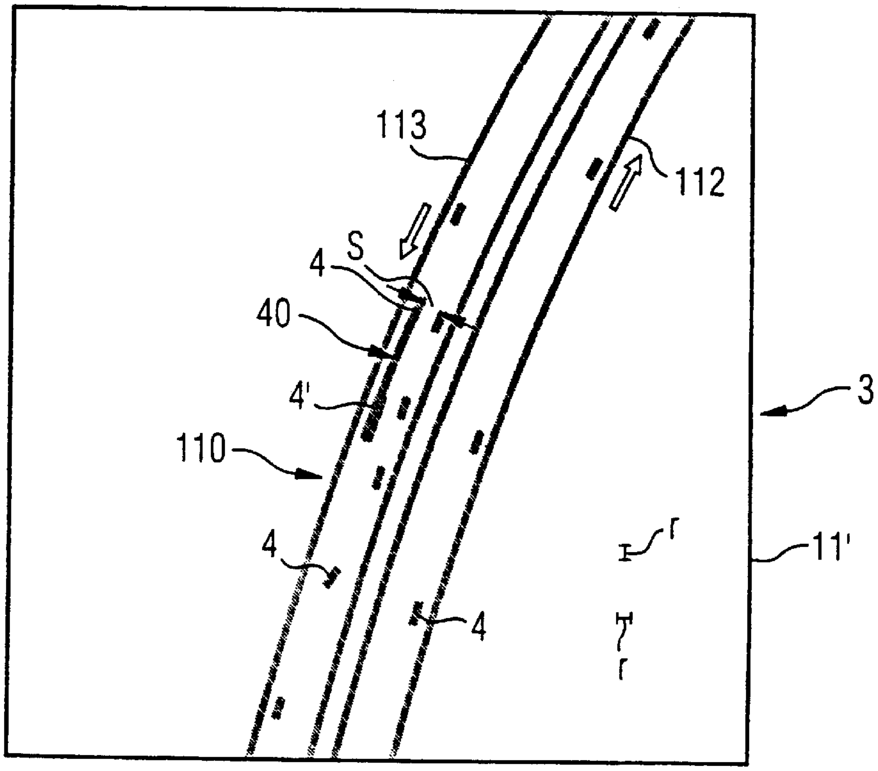
FIG. 3 shows a detail of an image of the region of the surface of the earth recorded by an artificial satellite orbiting the earth by means of radar radiation.

In relation to FIG. 3, it is assumed that the image detail 11' does not originate from a photographically recorded image of the region 10, but rather from an image 3 of the region 10 recorded using a radar radiation 5.

The image detail 11' according to FIG. 3 shows, as does the image detail 11' according to FIG. 2, only the highway 110 and the vehicles located thereon, but for the sake of simplicity does not show any further details of the landscape.

Let it be further assumed that the image 3 recorded using the radar radiation 5 was recorded from the satellite 2 at the same time as was the photographic image 3, so that in the image detail 11' according to FIG. 3 the vehicles 4' and 4 are in the same traffic state on the highway 110 as in the image detail 11' according to FIG. 2.

In comparison with the photographic image detail 11' according to FIG. 2, the image recorded using the radar radiation 5, and thereby the image segment 11' according to FIG. 3, comprises an unequally larger grid dimension $r>0.5$ m, and thereby an unequally weaker geometric resolution. The grid dimension r is indicated in FIG. 3.

On the basis of this comparatively coarse grid dimension r, in the image detail 11' according to FIG. 3, in contrast to the image detail 11' according to FIG. 2, the roadways 112 and 113, as well as the vehicles 4' and 4 on the roadways 112 and 113, do not have sharp boundaries. The dividing lines $\mathbf{112}_3$ and $\mathbf{113}_3$ also can no longer be recognized. The primary cause of the coarse grid dimension r is to be found in the larger wavelengths of the radar radiation 5, which are unequal to the optical wavelengths.

What is more, each vehicle on a roadway 112 and/or 113 appears as a diffuse spot, which is advantageously clearly distinguished in relation to the background formed by this lane. The reason for this is to be found in the advantageous circumstance that a lane, or in general the surface of the earth, has a significantly different reflective capacity for radar radiation 5 than does a vehicle located thereon.

In the image recorded using the radar radiation 5, and thus in the image detail 11', objects and distances that are smaller than the grid dimension r are no longer perceived.

In the method here specified, a grid dimension r that is essentially equal to two meters is advantageously sufficient.

Given this grid dimension r=2 meters, small, medium, and high densities of vehicles, corresponding to moderate, medium, and heavy traffic, can be recognized and distinguished from one another on the image 3 of the region 10 to the extent that the vehicles and distances between the successive vehicles can essentially be individually recognized, and, given moderate, medium, and heavy traffic, these distances are on average respectively clearly distinguished from one another.

On the other hand, given this grid dimension r=2 meters, slow traffic or stalled traffic can be recognized in that the vehicles on the image 3 are to a large extent no longer separated from one another, but rather are essentially seen as a continuous line, because the distances between successive vehicles are close to two meters. In particular, such a line having a length of one or more kilometers is a certain indicator of a traffic jam, if in a comparison of two or more images 3, recorded at different times, no movement of at least one end can be recognized, and is a certain indicator of slow traffic if such a comparison reveals a movement of the line.

In FIGS. 2 and 3, as an example it is assumed (though somewhat unrealistically) that the distance d0 between the successive four vehicles 4' and 4 of the group of vehicles 40 is close to or equal to two meters. This group 40 accordingly appears as a continuous line of vehicles.

The lengths of passenger vehicles differ from one another significantly by less than two meters, and, given a distance d of more than two meters, can be recognized as such with the method here specified. The lengths of trucks and buses of the same weight class also differ from one another by significantly less than two meters, but in many cases differ from passenger vehicles by more than two meters. In these cases, with the method here specified trucks and buses of the same weight class can be recognized as such and can be distinguished from passenger vehicles, at least in the case of flowing traffic and given a distance d of more than two meters. Different species and/or types of vehicles can thus be kept separate, and the densities thereof can also be determined individually using the radar radiation, which produces a grid dimension r of two meters.

Figure 4:
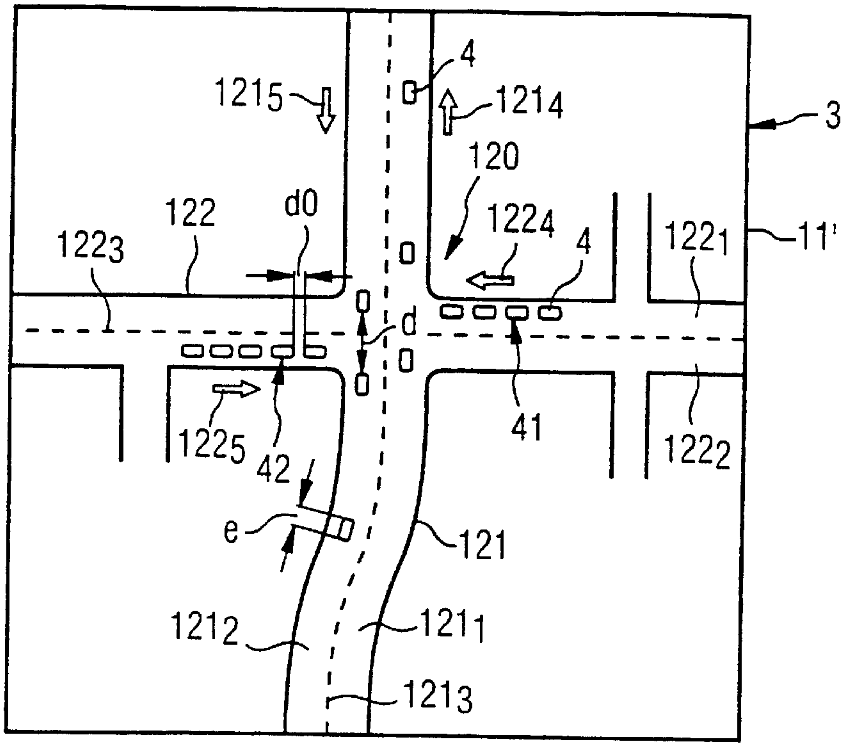
FIG. 4 shows a detail of an image of the region of the surface of the earth recorded photographically from an airplane in flight.
Figure 5:
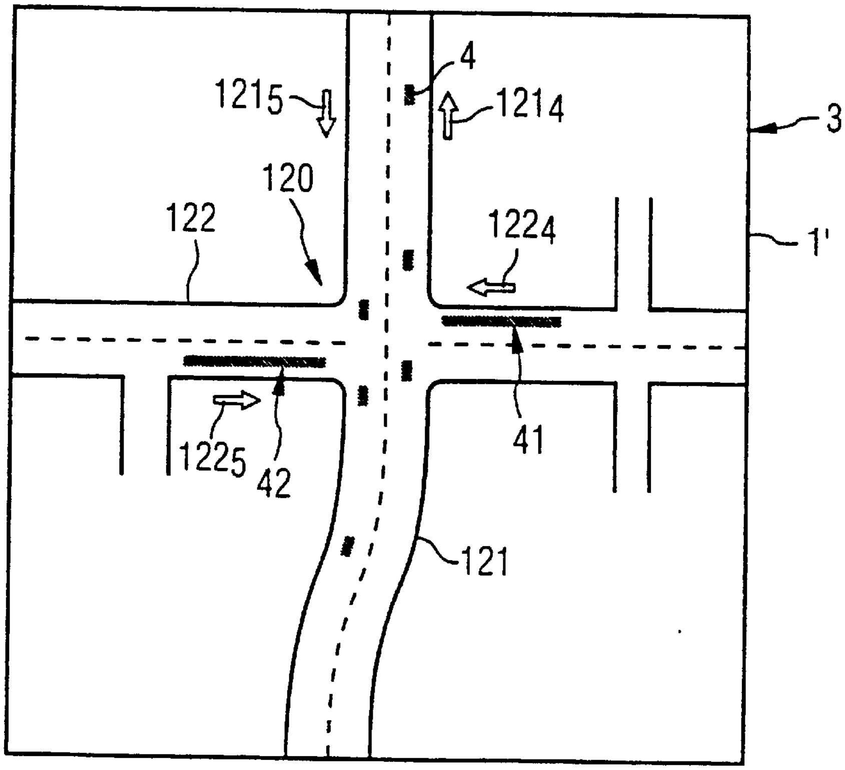
FIG. 5 shows a detail of an image of the region of the surface of the earth recorded by means of radar from an airplane in flight.

With reference to FIGS. 4 and 5, it is assumed that the body 2 according to FIG. 1 is an airplane flying at a distance a of 8 to 10 kilometers from the surface of the earth 1, from which an image of a region 10, for example which is strip-shaped, of the surface of the earth 1 is recorded, whereby the region 10 has a length l of approximately 9 kilometers and a width b of approximately 5 to 7 kilometers.

In FIG. 4, an image detail 11' of the image 3, recorded from the airplane 2, of the region 10 is shown, whereby it is assumed that this image 3 is produced photographically and the image detail 11' corresponds to the relatively small section 11 of the region 10 in FIG. 1.

For example, assume now that the region 10 is the street traffic network of a city, of which the segment 11 of the region 10 shows an intersection 120 traveled by vehicles. Other recognizable structures of the city landscape in the segment 11 of the region 10, such as for example trees and bushes, houses, additional streets, rivers, bridges, etc., are omitted in the image detail 11' according to FIG. 4 for the sake of simplicity.

In the intersection 120, for example, two streets 121 and 122 cross. Each street 121 and 122 has for example two lanes $\mathbf{121_1}$, $\mathbf{121_2}$, or, respectively, $\mathbf{122_1}$ or $\mathbf{122_2}$, separated from one another by a dividing line $\mathbf{121_3}$ or, respectively, $\mathbf{122_3}$.

In the street 121, the lane $\mathbf{121_1}$ is provided for a direction of travel $\mathbf{121_4}$, and the lane $\mathbf{121_2}$ is provided for the direction of travel $\mathbf{121_5}$ opposed to a direction of travel $\mathbf{121_4}$. In the street 122, the lane $\mathbf{122_1}$ is provided for a direction of travel $\mathbf{122_4}$, and the lane $\mathbf{122_2}$ is provided for the direction of travel $\mathbf{122_5}$ opposed to a direction of travel $\mathbf{122_4}$.

At the intersection 120, a traffic light installation (not shown) is present that at the moment at which the image was recorded was for example switched such that the street 122 has the red, and the vehicles—made up without exception of passenger vehicles 4—on both lanes $\mathbf{122_1}$ and $\mathbf{122_2}$ of this street 122 must wait in front of the intersection 120 while the vehicles—for example likewise made up without exception of passenger vehicles 4—on the two lanes $\mathbf{121_1}$ and $\mathbf{121_2}$ of the street 121 have the green and are permitted to cross the intersection 120.

Accordingly, on the street 122 a group 41 consisting of a plurality—for example four—passenger vehicles 4 is lined up on the street 122 in front of the intersection 120 on the lane $\mathbf{122_1}$, and on the lane $\mathbf{122_2}$ a group 42 consisting of a plurality—for example five—passenger vehicles 4 is so lined up.

In reference to FIG. 5, it is assumed that the image detail 11' does not originate from a photographically recorded image 3 of the region 10, but rather from an image 3 of the region 10 recorded using a radar radiation 5.

The image detail 11' according to FIG. 5 shows, as does the image detail 11' according to FIG. 4, only the intersection 120 with the streets 121 and 122 and the vehicles located thereon, and for the sake of simplicity shows no further details of the city landscape.

In comparison with the photographically recorded image 3, and thus with the image detail 11' according to FIG. 4, the image 3 recorded with the radar radiation 5, and thus the image detail 11' according to FIG. 5, comprises the unequally larger grid dimension r, of for example two meters, and thus an unequally weaker geometric resolution.

Let it also be assumed here that the image 3 recorded using the radar radiation 5 was recorded from the airplane 2 at the same time as was the photographic image 3, so that in the image detail 11' according to FIG. 5 the vehicles 4 are in the same traffic state as in the image detail 11' according to FIG. 4, on the intersecting streets 121 and 122.

On the basis of this comparatively coarse grid measure r, in contrast to the image detail 11' according to FIG. 4, in the image detail 11' according to FIG. 5 the streets 121 do and 122 as well as the vehicles 4 on the streets 121 and 122 are respectively not sharply delimited. The dividing lines $\mathbf{121_3}$ or, respectively, $\mathbf{122_3}$ also can no longer be recognized.

In this case as well, each vehicle 4 appears on the streets 121 and 122 as a diffuse spot that advantageously stands out clearly against the background given by these streets. The cause for this is again the favorable circumstance that a roadway, or in general the ground, has a significantly different reflection factor for the radar radiation 5 than does a vehicle located thereon.

Let it be assumed that in each group 41 and 42 of vehicles 4 on the street 122 each distance d0 between successive vehicles 4 is smaller than the grid dimension r, while on each lane $\mathbf{121_1}$ and $\mathbf{122_2}$ and on the street 121 each distance d between successive vehicles 4 is greater than the grid dimension r. Accordingly, each of these groups 41 and 42 appears as a continuous line of vehicles, while the vehicles 4 on the street 121 can be recognized individually.

The streets 121 and 122 according to FIGS. 4 and 5 are each a street with two-way traffic, that is, a street having one lane intended for one direction of travel and one lane intended for the opposite direction of travel, whereby these two lanes are separated from one another only by a dividing line, or at least run next to one another with a very small spacing. Given such a street, it is important to be able to allocate the vehicles to the individual lanes, and thereby directions of travel, on an image 3 of the region 10. This holds in particular in the case of slow traffic or stalled traffic. In this case, it is particularly important to allocate a line of vehicles indicating such a traffic state on the image 3 to the correct direction of travel, because, for example, it would be fatal to signal to the traffic participants a traffic jam in the wrong direction. A grid dimension r of two meters is advantageously sufficient for an unambiguous and reliable allocation of the vehicles to the correct lane and thereby the correct direction of travel.

Moreover, given this grid dimension r=2 m, it is advantageously also possible to recognize a parking situation on streets and places, that is, to determine to what extent streets and places are occupied by parking vehicles.

Besides the advantages presented above, the relatively coarse grid dimension r of two meters has the advantage that it is easy to realize using the advantageous radar radiation 5. However, the invention is not limited to this coarse grid dimension; rather, smaller, but also larger, grid dimensions can be used, according to the advantages to be gained at the moment according to the circumstances of the individual case. For example, a smaller grid dimension is to be used if it is important to recognize details that are smaller than two meters.

Regardless of whether an image of a region 10 is recorded using radar radiation 5 from a satellite 2 or from an aircraft 2, after such a recording of such an image of the region 10 it is useful to record at least one additional image of the region 10, and likewise to evaluate this image with regard to the at least one density of the at least one particular type of vehicle 4 located in the region 10, and thereby to compare at least two images recorded in this way with one another. Preferably, the sequence of at least two images of the region 10 is produced by chronologically successive individual momentary exposures.

Figure 6:
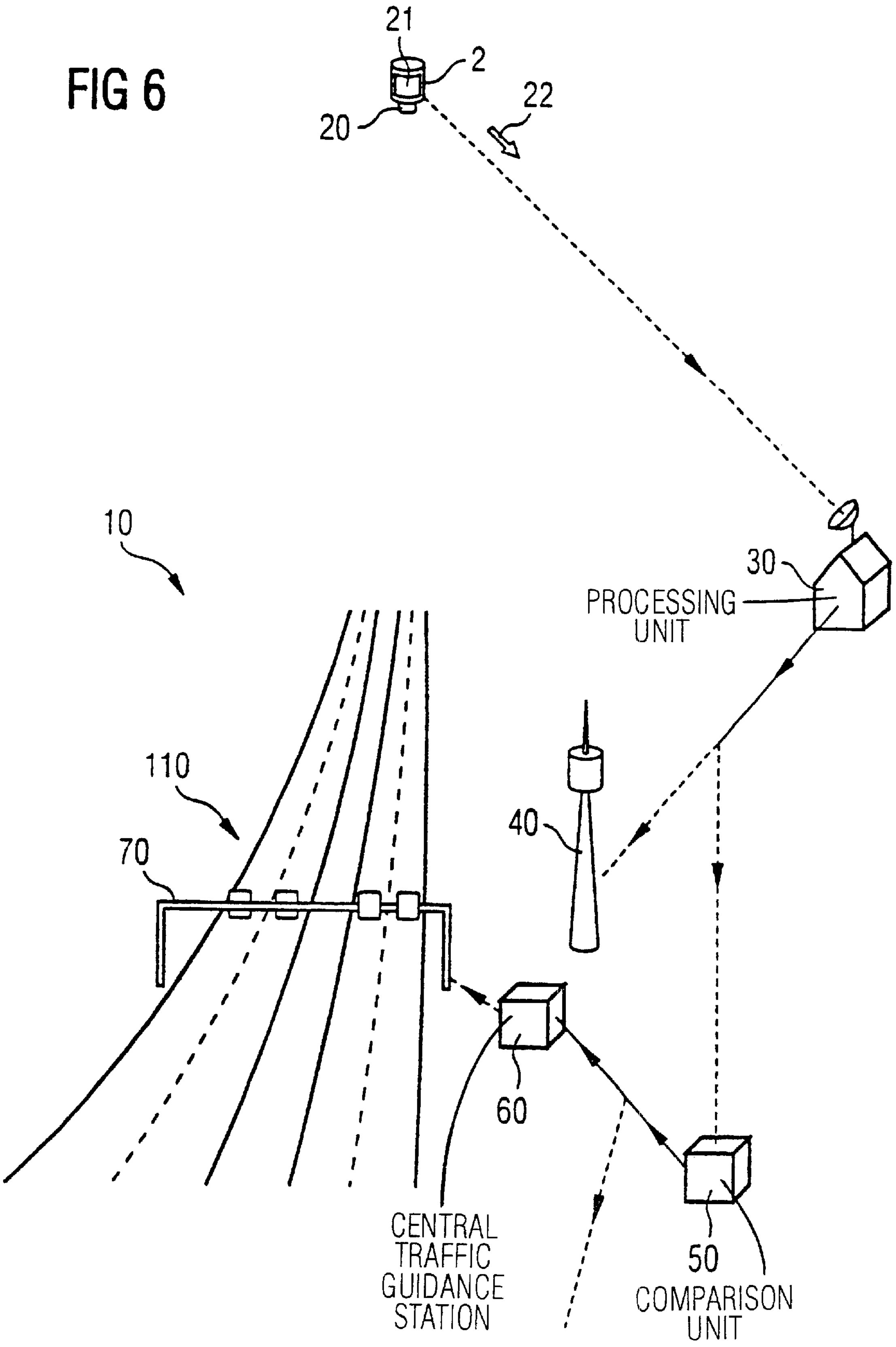
FIG. 6 shows an exemplary arrangement for the acquisition of a traffic state.

In the arrangement shown in FIG. 6 for acquiring a traffic state, an image recording unit 20 is present that is attached to a body 2 located at a distance a above the surface of the earth 1. This image recording unit 20 is used for an exposure of an image 3 of a region 10 that is located underneath the body 2 on and/or above the surface of the earth 1, and that has a lateral diameter of at least one kilometer.

The image is recorded with a grid dimension r that is small enough that densities at least of a particular type of vehicle located in the region 10, for example passenger vehicles 4 or buses or trucks 4' in FIGS. 2 and 3, can be recognized up to the maximum density determined by the grid dimension r.

Moreover, an evaluation unit 21 is present at the body 2 for an evaluation of the recorded image 3 with respect to at least one density of the at least one type of vehicle.

As already mentioned, the grid dimension r should be small enough so that on the image of the region 10 a spatial allocation can be recognized between at least one density of at least one type of vehicle, for example of the vehicles 4 or 4', and at least one roadway 110, 121, 122, provided for this type of vehicle 4, of the region 10. A grid dimension r of two meters is sufficient for this.

The evaluation unit 21 is for example fashioned such that it converts a particular information content of a recorded image 3 into coded data signals 22.

The image recording unit 20 and evaluation means 21 can be realized by the fully geocoded interferometric radar with synthetic aperture—developed for ground exposures for purposes other than the acquisition of a traffic state—known from the TRANS catalog of MST Aerospace GmbH, Cologne, Federal Republic of Germany, which provides no teachings or indications in relation to the present invention. In an ex post facto view from the point of view of the completed invention, this system is particularly suitable in particular for the acquisition over a large area of a state of street traffic, be it via geosatellite or via aircraft.

The coded data signals 22 produced by the evaluation unit 21 are transmitted to a processing unit 30 that processes—for example in computer-supported fashion—the data signals 22 in order to obtain an item of information concerning a traffic state in the region 10. The processing unit 30 is preferably housed in a ground station on the surface of the earth 1. The transmission of the coded data signals 22 are preferably transmitted in the form of electromagnetic waves from the body 2 through open space to the ground station.

The information obtained in the processing unit 30 from the data signals 22 concerning a traffic state in the region 10 can be supplied, via various transmission paths or information channels, to one or more different use unit for the use of such an item of information. A use unit can for example be a radio transmitter 40 via which the traffic participants can be informed via radio about the traffic conditions in the region 10, a comparison unit 50 that by means of before/after comparisons produces for example diagnoses concerning the development of traffic in the region 10, or many other things. For example, the unit 50 can forward its diagnoses to a central traffic guidance station 60, which can, with the aid thereof, control the flow of traffic on the streets, for example via variable display unit 70 that indicate target speeds to the traffic participants.

Images 3 of one and the same region 10 that has been recorded from different bodies 2, for example from a satellite and from an airplane, can also be evaluated and/or compared with one another, in particular even if these images have grid dimensions that differ from one another.

Although modifications and changes may be suggested by those skilled in the art, it is the intention of the inventors to embody within the patent warranted hereon all changes and modifications as reasonably and properly come within the scope of their contribution to the art.

We claim:

1. A method for acquiring a traffic state of vehicles, comprising the steps of:

from a body located at a distance above a surface of the earth, generating an image of a region located underneath the body at or above the surface of the earth and that has a lateral diameter of at least one kilometer;

recording said image with a resolution that is small enough so that a density of at least one particular vehicle type located in the region is recognized up to a predetermined maximum density; and evaluating the recorded image with regard to at least one density for at least one type of vehicle.

2. The method according to claim 1 wherein a geosatellite orbiting the earth is used as the body.

3. The method according to claim 1 whereby the image of the region having a diameter on the order of magnitude of at least 10 kilometers is recorded.

4. The method according to claim 1 whereby a geostationary geosatellite is used as the body.

5. The method according to claim 1 wherein an aircraft is used as the body.

6. The method according to claim 5 wherein the image recorded of the region has a diameter on the order of magnitude of one kilometer.

7. The method according to claim 1 wherein the image is recorded using a radar radiation.

8. The method according to claim 1 wherein the image is recorded with the use of interferometry.

9. The method according to claim 1 wherein the image is recorded with use of Doppler effect.

10. The method according to claim 1 wherein a spatial allocation is produced by means of georeferencing between a density recognized in the image of the region of vehicles, and a roadway of the region.

11. The method according to claim 1 wherein after the recording of the image of the region, at least one additional image of the region is recorded, and is likewise evaluated with respect to the at least one density of the at least one particular type of vehicle located in the region, and whereby at least two images recorded in this way are compared with one another.

12. The method according to claim 11 wherein at least one sequence of two images of the region is produced by individual momentary exposures succeeding one another chronologically within one hour.

13. The method according to claim 1, further comprising the step of converting a particular information content of the recorded image into coded data signals.

14. The method according to claim 13, wherein the coded signals are georeferenced coded signals.

15. The method according to claim 14, further comprising the step of processing the data signals to obtain an item of information concerning a traffic state in the region.

16. The method according to claim 15, further comprising the step of supplying the obtained item of information to a use unit.

17. A method of determining a traffic state of vehicles, comprising the steps of:

selecting a resolution for an image-producing beam so that separate vehicles whose traffic state is to be determined cannot be distinguished in an image produced by the image-producing beam when a spacing between the vehicles is less than or equal to the resolution;

radiating the image-producing beam having the selected resolution from a body located at a distance above a surface of a region in which the state of traffic is to be determined, the region having a lateral diameter of at least one kilometer;

recording the image produced by the image-producing beam, wherein first vehicles spaced apart more than the resolution are separately distinguishable in the recorded image and wherein groups of plural second vehicles spaced apart less than or equal to the resolution form continuous lines in the recorded image; and evaluating a density of vehicles in the recorded image based on occurrences of the continuous lines.

18. The method according to claim 17, further comprising the steps of:

recording another image in the region;

evaluating a density of vehicles in the another recorded image; and comparing the recorded and the another recorded images to determine changes in the state of traffic.

19. The method according to claim 18, wherein in said recording another image step, the image and the another image are recorded chronologically within one hour.

20. The method according to claim 17, further comprising the step of controlling a traffic guidance system based on the compared images.

* * * * *